United States Patent [19]

Robinson

[11] Patent Number: 4,615,557
[45] Date of Patent: Oct. 7, 1986

[54] SECURITY COVER FOR TRUCK BEDS

[76] Inventor: Arnie Robinson, 5930 Albermarle St., San Diego, Calif. 92139

[21] Appl. No.: 706,038

[22] Filed: Feb. 27, 1985

[51] Int. Cl.$^4$ ............................................. B60P 7/02
[52] U.S. Cl. .................................... 296/100; 296/102
[58] Field of Search ...................... 296/100, 102, 37.6, 296/10, 43

[56] References Cited

U.S. PATENT DOCUMENTS

| 2,909,387 | 10/1959 | Burtzloff | 296/10 |
| 3,489,456 | 1/1970 | Klanke | 296/100 |
| 3,514,152 | 5/1970 | Hermon | 296/100 |
| 3,762,763 | 10/1973 | Deshores | 296/100 |
| 4,261,611 | 4/1981 | Barry et al. | 296/100 |
| 4,444,427 | 4/1984 | Martin | 296/43 |

Primary Examiner—Robert B. Reeves
Assistant Examiner—Russell D. Stormer
Attorney, Agent, or Firm—Brown, Martin & Haller

[57] ABSTRACT

A security cover for placement upon the bed of a truck including a mounting frame having front and rear frame members interconnected by a pair of side frame members and means for securing the mounting frame on the bed of the truck, a plurality of arch members each connected to one end to one of the side frame members and connected at the other end to the other of the side frame members. A front one of the arch members is positioned above the front frame member. A plurality of covers are each hinge-mounted to a respective one of the arch members are included with each cover overlying the area confined by the side frame members, a respective hinge-mounted arch member and an adjacent one of the arch member. A rear one of the covers overlies the area defined by the side frame members, a respective hinge-mounted arch members and the rear frame member. Also included are means associated with each one of the covers for locking each cover in a closed position so as to prohibit entry into the truck bed.

4 Claims, 9 Drawing Figures

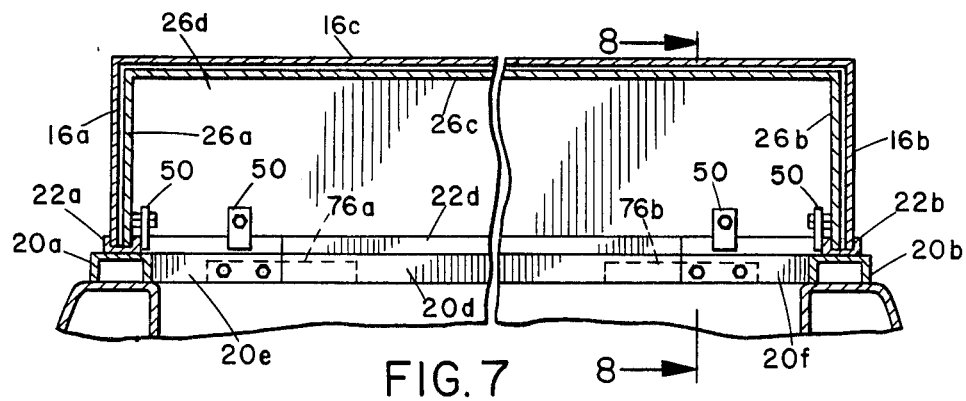
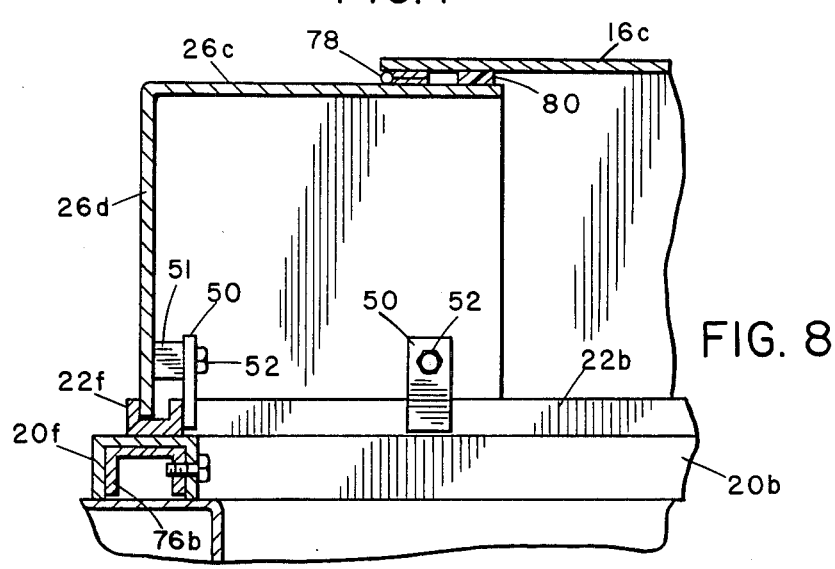
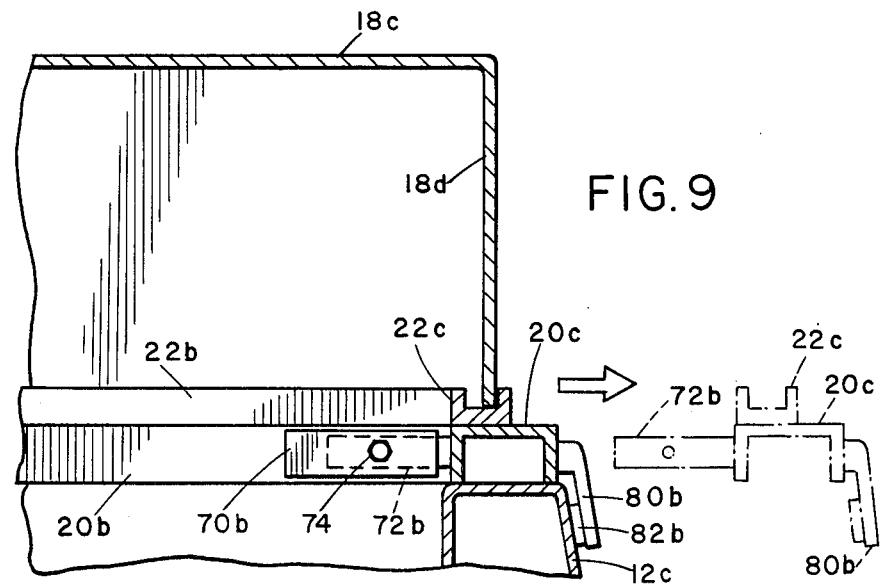

SECURITY COVER FOR TRUCK BEDS

BACKGROUND OF THE INVENTION

The present invention relates to security covers for truck beds. More specifically, the present invention relates to a novel truck bed security cover that is easily installed upon the vehicle and prevents unauthorized entry into the truck bed.

The previous devices for preventing unauthorized entry into the bed of a truck have included such items as camper shells and modular compartments. The camper shell approach involves the placement of a large shell, typically fiberglass or light metal, upon the bed of the truck. The shells are typically of a one-piece construction which makes it extremely bulky and cumbersome to install. Once installed and in the event that a large item needs to be moved, the shell would have to be removed in order to transport the large item.

Another device which prevents unauthorized entry into the truck bed are sealed containers that are attached within the truck bed. Generally these do not protect the entire truck bed with only portions thereof protected from unauthorized entry. In the event that a large quantity of items need to be stored and protected within the truck bed, the storage compartments are unable to protect the entire truck bed with the items therein.

It is therefore an object of the prevent invention to provide a security cover for truck beds which prevents unauthorized entry into the bed of the truck.

It is yet another object of the present invention to provide a truck bed security cover that is easily and quickly installed by a single person.

It is another object of the present invention to provide a truck bed security cover in which sections may be removed therefrom in order to transport large items within the truck bed without dismantling or removing the entire security cover.

It is a further object of the invention to provide a security cover for truck beds in which all mounting attachments are located within the interior of the security cover and truck bed so as to prohibit unauthorized removal of the security cover.

SUMMARY OF THE INVENTION

The present invention discloses a novel security cover for truck beds that is easily and quickly installed and provides the flexibility to be removed in sections to permit large items to be placed within the truck bed for transport. The security cover of the present invention includes a mounting frame that is mounted around the upper periphery of a walled truck bed. The mounting frame is fabricated in interconnecting sections for ease in installation. The mounting frame includes stakes for secured attachment within the stake sockets of the walled truck bed. Furthermore, the mounting frame includes a removable rear frame member that has retaining arms that project downwardly from the rear frame member so as to prohibit the opening of the truck tailgate without previously removing the rear frame member from the mounting frame.

A retaining channel is securely affixed to the mounting frame which recives arch members that span across the truck bed. The arch members are removably coupled to the mounting frame and/or the retaining channel. A forward arch member is included which overlaps the front frame member of the mounting frame.

Covers are hinge-mounted to each of the arch members such that when in a closed position each overlap the open area of the truck bed within the boundary defined by the mounting frame. Each cover rests within the retaining channel when in a closed position and opens upwardly by rotating about the axis of the hinge interconnecting the cover to the arch member.

A lock mechanism is included with each cover which enables the operator to lock the cover in a closed position so as to prohibit unauthorized entry into the truck bed.

BRIEF DESCRIPTION OF THE DRAWINGS

The features, objects, and advantages of the invention will be more fully apparent from the detailed description set forth below, taken in conjunction with the drawings in which like reference characters correspond throughout and wherein:

FIG. 7 is an enlarged sectional view taken on line 7—7 of FIG. 2;

FIG. 8 is an enlarged sectional view taken on line 8—8 of FIG. 7; and

FIG. 9 is an enlarged sectional view taken on line 9—9 of FIG. 6, showing the removable rear frame member.

DETAILED DESCRIPTION OF THE PREFERRED EMBODIMENTS

Figure 1:
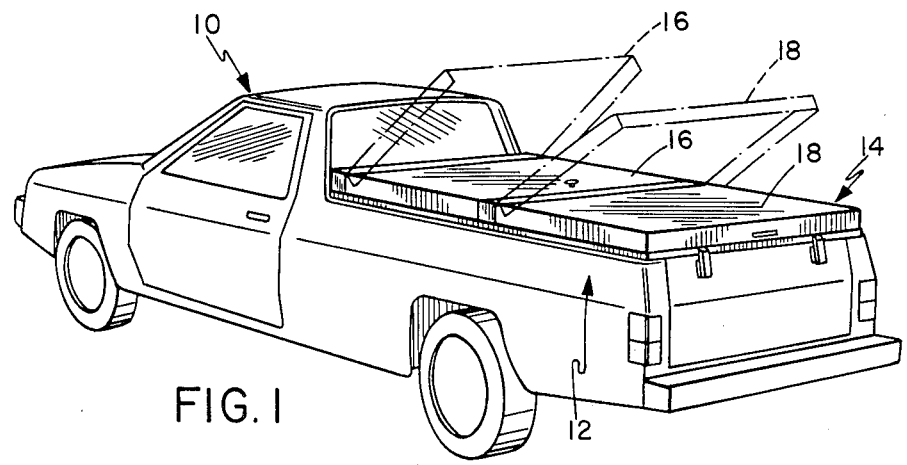
FIG. 1 is a perspective view of a typical pickup truck, showing the installation of the security cover.

FIG. 1 illustrates a truck 10 having a walled truck bed 12. The security cover 14 of the present invention is mounted upon truck bed 12. As illustrated in FIG. 1, security cover 14 includes a front cover 16 and rear cover 18 that may be independently opened or secured in a closed position to prevent unauthorized entry into truck bed 12.

Figure 2:
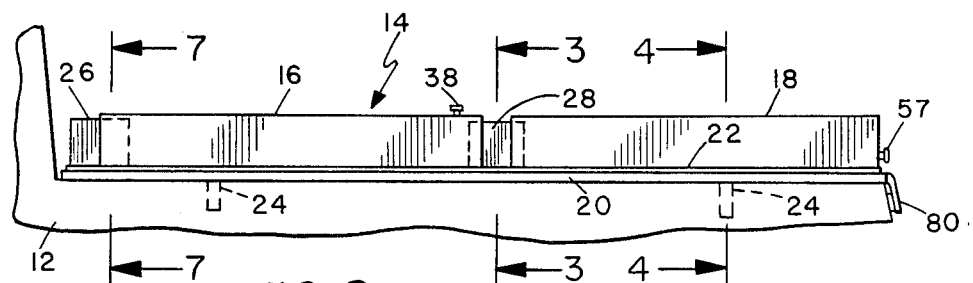
FIG. 2 is a side elevation view of the cover assembly.

FIG. 2 illustrates a side elevation view of the cover assembly as mounted upon truck bed 12. The cover assembly includes a mounting frame 20 upon which a retaining channel 22 is affixed thereto. Attached to mounting frame 20 and protruding in a downwardly direction are stakes 24 which are received in the stake sockets or truck bed 12. Front cover 16 is hinge-mounted upon front arch member 26 which is securely mounted within retaining channel 22. Front cover 16 extends from front arch member 26 in a rearward direction so as to rest in retaining channel 22 when in a closed position. Front cover 16 overlaps central arch member 28 when in the closed position. Rear cover 18 is hinge-mounted to central arch member 28 with central arch member 28 secured within retaining channel 22. Rear cover 18 rests within retaining channel 22 when in a closed position.

Figure 3:
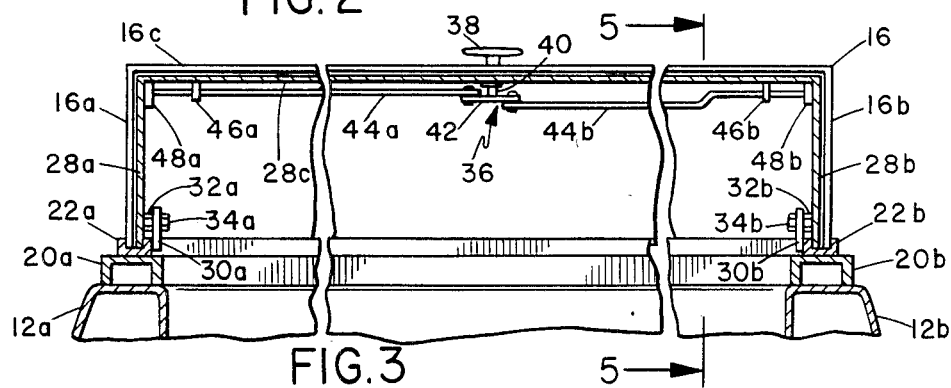
FIG. 3 is an enlarged sectional view taken on line 3—3 of FIG. 2.

FIG. 3 illustrates an enlarged sectional view taken across central arch member 28 in a forward direction. FIG. 3 illustrates truck bed sidewalls 12a and 12b having a top surface upon which are respectively mounted mounting frame side frame members 20a and 20b. Retaining channel portion 22a is securely affixed to side frame member 20a while retaining channel portion 22b is affixed to side frame member 20b.

Figure 5:
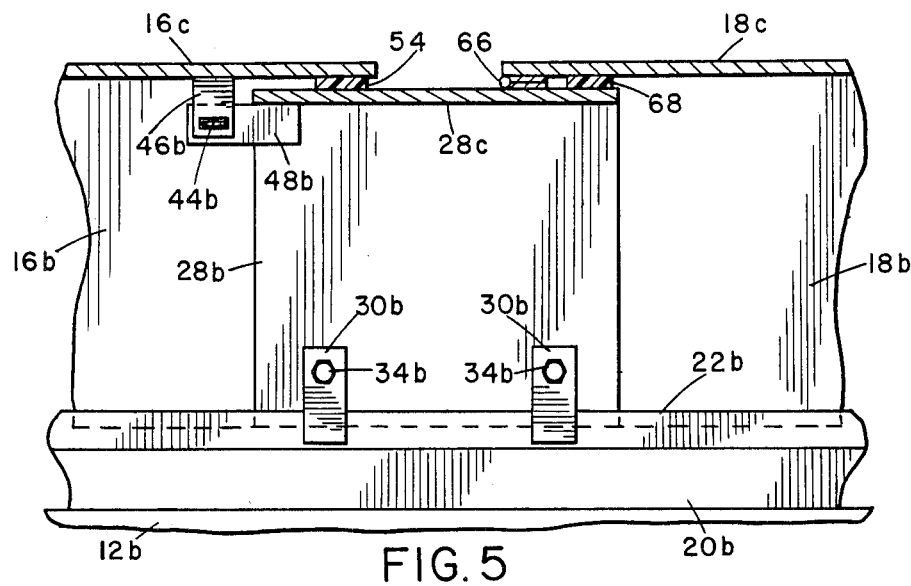
FIG. 5 is an enlarged sectional view taken on line 5—5 of FIG. 3.

Central arch member 28 illustrated in FIGS. 3 and 5 includes side panels 28a and 28b extending downward from opposite ends of a top panel 28c. Side panel 28a is removably secured within retaining channel portion 22a by a bracket 30a which is securely affixed to either side frame member 20a or retaining channel portion 22a. Side panel 28a includes a nut 32a welded or affixed to side panel 28a by means well known in the art. A bolt 34a protrudes through a hole in bracket 30a and engages with nut 32a. Similarly, side panel 28b is retained within retaining channel portion 22b as side panel 28a within retaining channel portion 22a.

Front cover 16 includes a pair of side panels 16a and 16b that extend in a downwardly direction from a top panel 16c and overlap the respective components of central arch member 28. Side panels 16a and 16b are respectively received within retaining channel portions 22a and 22b to the exterior of side panels 28a and 28b. Mounted within the top panel 16c is a bell crank lock mechanism 36 having a handle 38 which includes a key lock mechanism. Bell crank lock mechanism 36 also includes shaft 40 coupled to handle 38 at one end and at the other end coupled to plate 42. Attached to plate 42 are a pair of arms 44a and 44b. Arms 44a and 44b respectively extend outwardly towards side panels 16a and 16b and are rspectively supported by guides 46a and 46b. Guides 46a and 46b are attached to an inner wall of top panel 16c and have a slot through which the respective arm extends. Respectively mounted upon the inner walls of side panels 28a and 28b are brackets 48a and 48b. Brackets 48a and 48b each include a slot for respectively receiving arms 44a and 44b when front cover 16c is in the closed position and bell crank lock mechanism 36 is in the locked position.

FIG. 5 illustrates an inside view of the cover assembly about central arch member 28. FIG. 5 illustrates the alignment of slots of guide 46b and bracket 48b which permit the arm 44b to protrude through guide 46b for locking engagement within the slot of bracket 48b. Brackets 30b are affixed to retaining channel portion 22b and/or side frame member 20b. As illustrated in FIG. 5, brackets 30b are affixed only to retaining channel portion 22b. Bolts 34b each extend through a hole in brackets 30b and engage with nuts (not shown) secured to the inner wall of side panel 28b. Weatherstrip 54 is placed between the overlapping connection of front cover 16 and central arch member 28 to prevent water from extering the truck bed.

Figure 4:
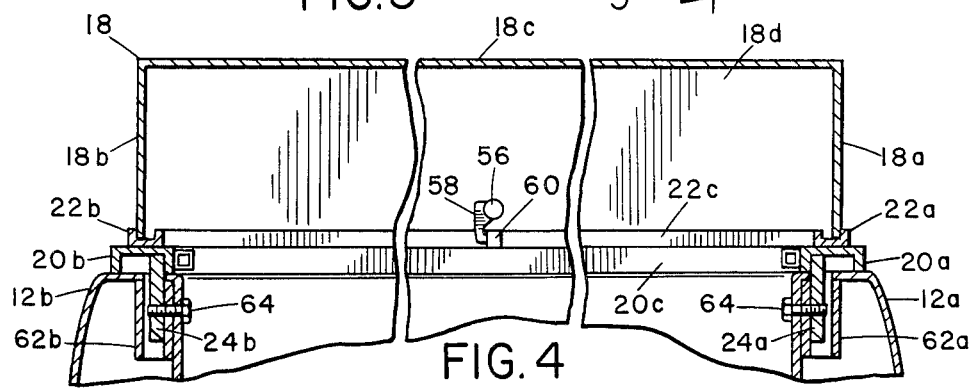
FIG. 4 is an enlarged sectional view taken on line 4—4 of FIG. 2.

FIG. 4 illustrates a sectional view of the cover assembly taken across a rearward view of rear cover 18. Rear cover 18 includes a pair of side panels 18a and 18b which extend downwardly from opposite ends of a top panel 18c. Side panels 18a and 18b respectively rest in retaining channel portions 22a and 22b. Rear cover 18 includes a rear panel 18d which extends downwardly from the rear edge of top panel 18c and is integrally connected with side panels 18a and 18b. Rear panels 18d rests within retaining channel portion 22c when rear cover 18 is in a closed position. Mounted within rear panel 18d is a handle lock 56, including a handle (not shown) which includes a key lock mechanism. Handle lock 56 includes an arm 58 which mates with a latch socket 60 mounted on retaining channel 22c and/or rear frame member 20c. When rear cover 18 is in a closed position and the handle of handle lock 56 is positioned so as to engage arm 58 within latch socket 60, cover 18 is secured in the closed position from unauthorized entry when key locked.

Stakes 24a and 24b are respectively affixed to side frame members 20a and 20b and project downwardly therefrom into stake sockets 62a and 62b. Stakes 24a and 24b each include a threaded hole or nut attached thereto for receiving a bolt 64 through an opening in the inner wall of side wall 12. Bolts 64 engage the nuts or threaded openings in stake 24a and 24b so as to secure retaining stakes 24 within the respective stake socket thereby providing secure coupling of mounting frame 20 upon truck bed 12.

FIG. 5 illustrates the attachment of rear cover 18 to central arch member 28. In FIG. 5, hinge 66, typically a piano hinge, is coupled to a top wall of top panel 28c and a bottom wall of top panel 18c so as to permit the rear portion of rear cover 18 to rotate about hinge 66 in upward direction from the closed position. Weatherstrip 68 is included between top panels 18c and 28c to prevent water from leaking into the truck bed.

Figure 6:
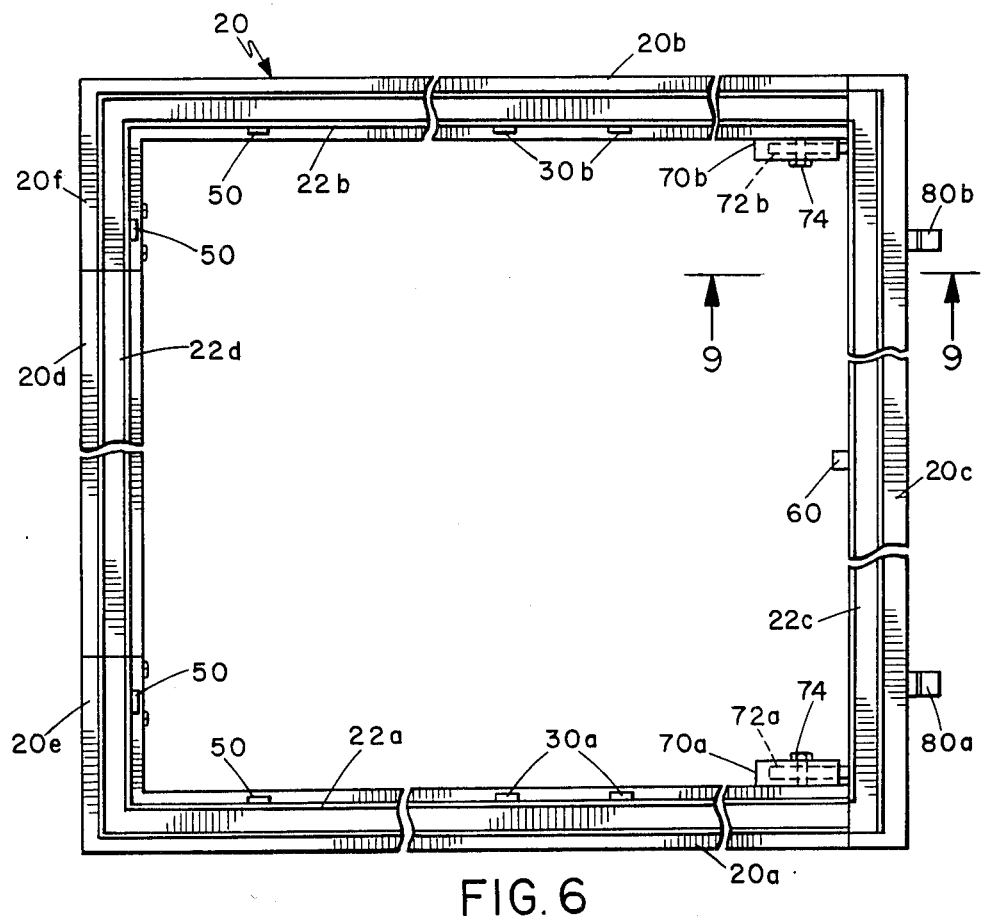
FIG. 6 is a top plan view of the mounting frame.

FIG. 6 illustrates a top plan view of the mounting frame 20 of the present invention. A front frame member is comprised of three sections 20d, 20e, and 20f. Section 20e is integrally formed at a 90° angle with one end of side frame member 20a. Correspondingly, section 20f is integrally formed at a 90° angle to one end of side frame member 20b. Section 20d interconnects sections 20e and 20f upon the truck bed. The front frame member is split into sections for ease in installation of the mounting frame upon the truck bed. Each of the front frame member sections include a corresponding retaining channel portion.

Rear frame member 20c is removably coupled from side frame members 20a and 20b by a sleeve-plug arrangement. Respectively attached to the inner walls of side frame members 20a and 20b are hollow sleeves 70a and 70b. Mounted upon rear frame member 20c are plugs 72a and 72b. Plug 72a slides into sleeve 70a while plug 72b slides into sleeve 70b. Sleeves 70a and 70b each have a hole that is aligned with a hole in plugs 72a and 72b when plugs 72a and 72b are fully inserted within sleeves 70a and 770b. When the holes in the sleeves and plugs are aligned, rear frame member 20c abuts the ends of side frame members 20a and 20b. A bolt for pin 74 may be inserted within each sleeve plug aligned opening.

FIG. 7 illustrates a sectional view of the cover assembly taken across the front cover and front frame member in a forward direction. FIG. 8 illustrates a side sectional view of a portion of FIG. 7. Connecting member 76a and 76b respectively span across portions of front frame member sections 20e and 20d, and 20f and 20d. Connecting members 76a and 76b are both permanently affixed to section 20d and are removably coupled by means such as bolts to sections 20e and 20f.

Front arch member 26 includes a pair of side panels 26a and 26b extending downwardly from opposite ends of top panel 26c. Front arch member 26 includes a front panel extending downwardly from a forward edge of top panel 26c and is integrally connected to side panels 26a and 26b. Side panels 26a and 26b and front panel 26d are secured within retaining channel 22 by brackets 50, bolts 52 and nuts 51 in a manner similar to that previously discussed with reference to the securing of central arch member 28 in retaining channel 22.

FIG. 8 illustrates the hinge mounting of front cover top panel 16c to top panel 26c by hinge 78. Hinge 78 permits front cover 16 to rotate in an upward direction about hinge 78 when in the closed position. Furthermore, weatherstrip 80 is included between top panels 16c and 26c adjacent hinge 78 to prevent water from entering the truck bed.

FIG. 9 illustrates a side sectional view of a portion of the rear cover assembly. In FIG. 9, rear frame member 20c is coupled to side frame member 20b. Plug 72b is inserted into sleeve 70a and secured therein by pin 74. Rear frame member 20c includes a pair of downward projecting retaining arms 82 with retaining arms 82b illustrated in FIG. 9. Retaining arms 82 prohibit the opening of the tailgate 12c of truck bed 12. The truck bed tailgate may be opened only upon the removal of rear frame member 20c. A pair of pads 84 are located between the outer wall of tailgate 12c and retaining arms 82 with pad 84b illustrated in FIG. 9. To facilitate the opening of tailgate 12c, rear cover 18 must be lifted above retaining channel portion 22c sufficient to permit the extraction of pins 74, which would enable the rearward movement of plugs 72 from sleeves 70.

In a preferred embodiment of the invention, mounting frame 20 is constructed from a 2″ by 2″ U-shaped channel of a rigid material such as steel or aluminum. Retaining channel 22 is preferably a ½″ U-shaped channel made from a material such as steel or aluminum. Front and central arch members are preferably constructed from a rigid material such as steel while front and rear covers are constructed from a lightweight material such as ⅛″ aluminum.

The present invention includes features such as the sectional construction which permits removal of portions of the security cover in the event that large objects need to be carried in the truck bed. For example, the rear cover and central arch member may be readily decoupled from the mounting frame so as to permit the carrying of large objects. In this event, the rear cover and central arch member may be easily stored beneath the front cover for later reinstallation. An added feature of the invention is that all mounting bolts and pins are located within the area protected by the security cover. This feature prevents unauthorized removal of the frame when the covers are closed and locked.

The previous description of the preferred embodiment is provided to enable any person skilled in the art to make or use the present invention. Various modifications to this embodiment will be readily apparent to those skilled in the art, and the generic principles defined herein may be applied to other embodiments without the use of the inventive faculty. Thus, the present invention is not intended to be limited to the embodiment shown herein, but is to be accorded the widest scope consistent with the principles and novel features disclosed herein.

I claim:

1. A removable security cover for placement upon a truck bed having stake sockets comprising:

a mounting frame having front and rear frame members interconnected by a pair of side frame members, said rear frame member being removably coupled on the interior of the security cover to said pair of side frame member and includes retaining arms extending downwardly from said rear frame member outside of said truck bed, and means for securing said mounting frame upon the bed of a truck, said means for securing said mounting frame upon the bed of a truck including at least one stake attached to said mounting frame, each stake positioned along said mounting frame so as to be received within the truck bed stake sockets for removable coupling thereto;

a retaining channel attached to said mounting frame;

a plurality of arch member each removably coupled to said mounting frame with each arch member having an arch member top panel and a pair of arch member side panels extending in a downward direction from opposite ends of the arch member top panel, each arch member having one arch member side panel secured within the retaining channel located on one side frame member and the other arch member side panels secured within the retaining channel located on the other side frame member, said plurality of arch members including a front arch member and a central arch member, said front arch member having a front panel extending in a downward direction from a forward end of said front arch member and integrally connected to said front arch member side panels, said front panel secured within the retaining channel located on said front frame member, said central arch member located along said side frame members between said front arch member and said rear frame member;

a plurality of covers each hinge-mounted to a respective one of said plurality of arch members, said plurality of covers including a front cover and a rear cover, said front cover hinge-mounted to said front arch member and overlying said central arch member, said rear cover hinge-mounted to said central arch member, each cover having a cover top panel and a pair of cover side panels extending in a downward direction from opposite ends of said cover top panel, each cover having one cover side panel resting in the retaining channel located on one side frame member and the other cover side panel resting in the retaining channel located on the other side frame member when said cover is in a closed position, said rear cover having a back panel extending in a downward direction from a rear end of said rear cover and integrally connected to the rear cover side panels, said rear cover back panel resting in the retaining channel located on said rear frame member when in a closed position; and lock means associated with each one of said covers for locking each cover in a closed position so as to prohibit entry into the truck bed.

2. The security cover of claim 1 wherein:

said front arch member further includes front arch member coupling means for removably securing said front arch member to said mounting frame, said front arch member coupling means being located within the interior of said security cover; and said central arch member further includes central arch member coupling means for removably securing said central arch member to said mounting frame, said central arch member coupling means being located within the interior of said security cover.

3. The security cover of claim 1 wherein said lock means associated with said front cover includes a bell crank mechanism connected to said front cover and said central arch member for selectively locking engagement of said front cover to said central arch member.

4. The security cover of claim 1 wherein said lock means associated with said rear cover includes a rotary latch connected to said rear cover and said rear frame member for selectively locking engagement of said rear cover to said rear frame member.

* * * * *